Figure 1:
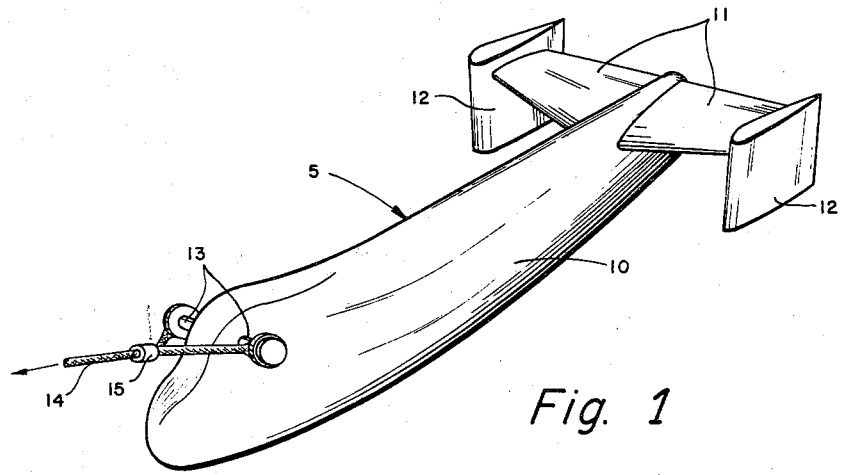

Jan. 29, 1957 H. M. TROXELL 2,779,553
NOSE TOWED AIRBORNE CAPSULE
Filed Jan. 13, 1954

INVENTOR.
Harold M. Troxell
BY
Attorneys

United States Patent Office 2,779,553
Patented Jan. 29, 1957

2,779,553

NOSE TOWED AIRBORNE CAPSULE

Harold M. Troxell, Burlington, N. J.

Application January 13, 1954, Serial No. 403,946

6 Claims. (Cl. 244—3)

(Granted under Title 35, U. S. Code (1952), sec. 266)

The invention described herein may be manufactured and used by or for the Government of the United States of America for governmental purposes without the payment of any royalties thereon or therefor.

This invention relates to a nose towed airborne capsule and more particularly to a capsule including an aeroform body and lifting surfaces attached thereto arranged to be towed at the end of a length of cable attached to a towing aircraft.

In the past, capsules designed to contain equipment to be towed at a distance from an aircraft were customarily connected to the end of a cable by suitable attachment means located at or slightly behind the center of gravity of the capsule with the equipment installed therein. With such an arrangement, the use of some type of fins including drag fins was necessary to insure a limited degree of dynamic stability of the capsule assembly. This type of capsule was characterized by numerous disadvantages. First, whenever it became necessary to maneuver the towing aircraft, such a capsule assembly developed pendulous oscillations undesirable in numerous respects, and particularly because of the adverse effect on signals generated by the equipment mounted in the capsule. Second, as the length of the towing cable was shortened in the course of retrieving a capsule assembly of this type, the capsule developed pendulous oscillations of a rather violent nature which rendered retrieving operations with such a capsule extremely hazardous. Third, in view of the second disadvantage noted above, the numerous operations involved in letting out and retrieving a capsule assembly of this type required several skilled operators working simultaneously. Fourth, in many installations making use of this type of capsule, it was necessary to "weight" the assembly in order to achieve optimum balance with equipment installed therein. Finally, the aerodynamic characteristics of this type of capsule were such that the towing cable to which it was attached necessarily extended downwardly at a steep angle from the towing aircraft, further increasing the drag imposed on the aircraft so that the range of operation was substantially reduced unless provisions were made for carrying additional fuel.

The instant invention contemplates a capsule assembly in which the central element is an elongated hollow fuselage provided with attachment means adjacent its forward end for connection to the end of a towing cable and with supporting airfoil surfaces and vertical stabilizing surfaces all located at the rearward end of the fuselage. A capsule assembly with this improved configuration will continuously "track" an aircraft by which it is being towed with little or no tendency to develop pendulous oscillations during turns. Moreover, any such oscillations which do develop are rapidly damped. In addition, a capsule assembly incorporating this improved configuration remains stable as the length of the towing cable is shortened during retrieving operations. The high degree of directional stability of the present invention under the various operating conditions involved in its normal use makes it possible for a single operator to extend and retrieve the towing cable with the capsule assembly attached by operation of a simple in-out switch on an automatic retrieving mechanism such as that described in copending application serial No. 436,261, filed June 11, 1954. With the capsule assembly supported both by the towing cable attached at the forward end and by the lifting surfaces located at the rearward end, the position of the center of gravity as affected by the equipment installed in the capsule is not extremely critical. Consequently, it is unnecessary to "weight" this improved capsule assembly in order to maintain proper balance. Finally, since the lifting surfaces attached to the capsule assembly support part of the weight of the capsule and its contents, the angle at which the towing cable depends from the aircraft is substantially reduced. Hence, the total drag imposed upon the aircraft by the capsule assembly and its towing cable is correspondingly reduced with the result that the performance of the towing aircraft is improved.

An object of the present invention is the provision of an improved airborne capsule assembly which may be towed at the end of a cable attached to a towing aircraft with a substantially diminished drag load imposed upon the aircraft, due to the presence of the capsule.

Another object is to provide an airborne capsule assembly with improved directional stability when towed at the end of a relatively long cable.

A further object of the invention is the provision of an improved airborne capsule assembly having a configuration in which the position of the center of gravity is not critical to a high degree.

A final object of the present invention is the provision of an airborne capsule assembly arranged to be towed at the end of a cable attached to a towing aircraft and designed to remain directionally stable when it is connected to the aircraft by a relatively short length of cable, in order to facilitate the operations involved in extending and retrieving the towing cable in flight.

Figure 2:
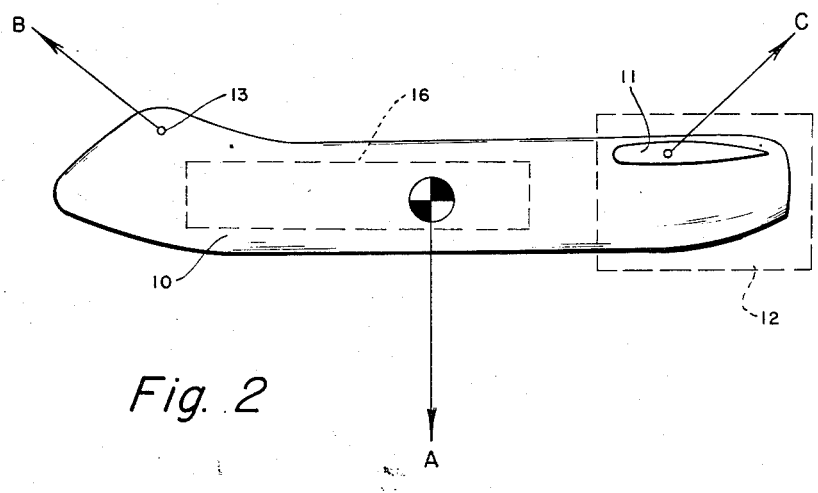

The exact nature of this nature of this invention as well as other objects and advantages thereof will be readily apparent from consideration of the following specification relating to the annexed drawing in which:

Fig. 1 is a perspective view showing one embodiment of the present invention, and Fig. 2 is a diagrammatic representation showing the relationship between the various forces acting upon an airborne capsule assembly of the type shown in Fig. 1.

Referring now to the drawing, wherein like reference characters designate like or corresponding parts throughout the several views, there is shown in Fig. 1 an improved capsule assembly 5, including a hollow elongated body portion or fuselage 10, lifting airfoil surfaces 11 attached to the rearward end of the fuselage 10, vertical stabilizing fins 12 attached to the outer ends of the lifting surfaces 11, a pair of attachment means 13 projecting from opposite sides of the fuselage 10 adjacent the forward end thereof and preferably mounted upon a faired upwardly projecting supporting structure, and a towing cable 14 connected to the attachment means 13 by a suitable bridle 15. This capsule assembly 5 is designed to be towed at a considerable distance behind an aircraft to which it is connected by means of the towing cable 14.

It is considered desirable that the attachment means 13 be off-set vertically above the center of gravity of the capsule assembly 5, in order to establish a righting moment for maintaining the capsule assembly in an upright position during normal flight and for restoring the capsule assembly to an upright position in the event it is upset by abnormal gust loads. In addition, the location of the attachment means on an upwardly projecting supporting structure facilitates cooperation with latch means arranged to secure the capsule assembly in its stowed position. The structural details of the attachment means and the faired supporting structure are not shown since their size and shape may be modified as necessary to adapt the capsule assembly for use with various types of retrieving mechanisms, for example, the mechanism shown in co-pending application Serial No. 436,261, filed June 11, 1954.

The lateral spacing of the attachment means 13, as illustrated in Fig. 1, and the use of a bridle 15 for the connection of a towing cable 14 to these attachment means is particularly effective for eliminating extremely undesirable oscillations about the longitudinal or roll axis of the capsule assembly, and hence, constitutes a substantial contribution to the greatly enhanced stability characteristics of this device.

The showing in Fig. 2 indicates the disposition of the various forces applied to the capsule assembly 5 in flight, and hence, the novel relationship between these forces in this configuration of an airborne capsule. The force represented by the arrow identified by letter A is shown applied at the center of gravity of the capsule assembly including whatever equipment 16 is stowed therein. In flight, the force A is applied in the general direction indicated due to the gravitational effect upon the capsule and its contents. The force represented by the arrow indicated by the letter B is that applied to the capsule assembly through the cable 14, the bridle 15, and the attachment means 13, upon the fuselage 10. In flight, the force B is applied in the general direction indicated by the arrow, since this is the direction in which the cable extends from the capsule to the towing aircraft. The force represented by the arrow identified by the letter C is the resultant of the lifting force generated by the airfoil surfaces 11 and the drag forces imposed upon the fuselage 10 and the airfoil surfaces 11 and 12. In flight, the resultant force C is applied in the general direction indicated by this arrow. This novel relationship between the forces applied to a capsule assembly, as illustrated in Fig. 2, is particularly significant because it assures a high degree of directional stability in an airborne capsule assembly constructed according to the teachings of the present invention in sharp contrast to the relatively low degree of directional stability which was attainable possible with any previously known type of airborne capsule assembly.

In operations involving the use of an airborne capsule assembly, it is customary to suspend the capsule beneath or within the towing aircraft during landing and takeoff operations, and to extend and retract the towing cable in flight in order to place the capsule in its operating position remote from the towing aircraft for the desired interval during flight. For this reason, it is essential that the capsule assembly have a high degree of directional stability at all cable lengths between the fully retracted position with the capsule stowed in or beneath the aircraft and the fully extended position in which the full length of the cable separates the capsule and the aircraft. Moreover, since certain equipment frequently installed in the capsule assembly is rendered almost completely ineffective by substantial pendulous oscillation of the container in which it is housed, it is also essential to insure that the capsule will track the towing aircraft with a negligible tendency to develop such pendulous oscillations during maneuvers.

The entire capsule assembly may conveniently be constructed from laminated wood, but it may also be constructed from other non-magnetic material, preferably also non-metallic, such as Fiberglas or other molded plastic material. Furthermore, the embodiment shown in Fig. 1 is only one of numerous suitable configurations for the capsule assembly. For example, the lifting surfaces 11 may be sharply swept back if so desired; the capsule assembly may also be constructed in the form of a pod and a boom projecting rearwardly therefrom to support the lifting and stabilizing surfaces at a distance from the pod; or the capsule assembly may be constructed in the form of a flying wing large enough to enclose the desired equipment therein.

Since certain changes in this invention may be made without departing from the spirit and scope thereof it is intended that all matters contained in the foregoing description and shown in the accompanying drawings shall be intrepreted as illustrative and not in a limiting sense.

What is claimed is:

1. A nose towed airborne capsule assembly for dynamically stabilized support of airborne equipment at a substantial distance from the towing aircraft, comprising a hollow elongated generally cylindrical aeroform body enclosed at its forward and rearward ends by suitable faired surfaces and arranged to support a substantial mass therein with its weight so distributed that the center of gravity of the loaded body is substantially midway between its opposite ends, an elongated horizontal airfoil-shaped lifting surface attached intermediate its ends to the upper surface of said body relatively rearwardly of the center of gravity thereof and symmetrically arranged to extend transversely of said body, a pair of vertical airfoil-shaped stabilizing surfaces mounted upon the opposite ends of said horizontal surface and arranged to depend therefrom, a faired supporting structure projecting upwardly from the forward end of said body, attachment means mounted upon opposite sides of said supporting structure and a towing bridle comprising an elongated flexible member connected at its opposite ends to the respective attachment means and having coupling means disposed midway between its opposite ends for attachment to the end of a towing cable, whereby the forward and upward force applied by a towing cable to the body forward of and above the center of gravity and the rearward and upward resultant force applied by the lifting surface to the body rearwardly of and above the center of gravity together oppose the downward force due to gravity effectively applied at the center of gravity, thereby rendering said capsule assembly extremely stable in a substantially horizontal flight position.

2. A nose towed airborne capsule assembly for a dynamically stabilized support of airborne equipment at a substantial distance from the towing aircraft, comprising a hollow elongated generally cylindrical aeroform body enclosed at its forward and rearward ends by suitable faired surfaces and arranged to support a substantial mass therein with its weight so distributed that the center of gravity of the loaded body is substantially midway between its ends, said body being at least four times as long as its greatest transverse dimension, an elongated horizontally disposed airfoil-shaped lifting surface attached intermediate its ends to the upper surface of said body adjacent its rearward end, within the rearmost quarter of its length, and symmetrically arranged to extend transversely of said body, a pair of vertical airfoil-shaped stabilizing surfaces mounted upon the opposite ends of said horizontal surface and arranged to depend therefrom, a faired supporting structure projecting upwardly from the forward end of said body, within the forwardmost quarter of its length, and attachment means mounted upon said supporting structure for connecting said body to the end of a towing cable, the mass of said loaded body being so disposed that the center of gravity is located substantially below said horizontal lifting surface and said attachment means when the body is horizontally disposed, whereby the forward and upward force applied by a towing cable to the body through said attachment means and the rearward and upward resultant force applied by the lifting surface through its attachment to the body together oppose the downward force due to gravity effectively applied at the center of gravity of the body, thereby maintaining said body in a substantially horizontal flight position with a high degree of stability.

3. A nose towed airborne capsule assembly for dynamically stabilized support of airborne equipment at a substantial distance from the towing aircraft, comprising a hollow elongated generally cylindrical aeroform body enclosed at its forward and rearward ends by suitable faired surfaces and arranged to support a substantial mass therein with its weight so distributed that the center of gravity of the loaded body is substantially midway between its ends, said body being at least four times as long as its greatest transverse dimension, an elongated horizontally disposed airfoil-shaped lifting surface attached intermediate its ends to the upper surface of said body adjacent its rearward end, within the rearmost quarter of its length, and symmetrically arranged to extend transversely of said body, a pair of vertical airfoil-shaped stabilizing surfaces mounted upon the opposite ends of said horizontal surface and arranged to depend therefrom, a faired supporting structure projecting upwardly from the forward end of said body, within the forwardmost quarter of its length, laterally spaced attachment means mounted upon opposite sides of said supporting structure, and a towing bridle connected at its opposite ends to the respective attachment means and having coupling means disposed midway between its opposite ends for attachment to the end of a towing cable, the mass of said loaded body being so disposed that the center of gravity is located substantially below said horizontal lifting surface and said attachment means when the body is horizontally disposed, whereby the forward and upward force applied by a towing cable to the body through said attachment means and the rearward and upward resultant force applied by the lifting surface through its attachment to the body together oppose the downward force due to gravity effectively applied at the center of gravity of the body, thereby maintaining said body in a substantially horizontal flight position with a high degree of stability.

4. A nose towed airborne capsule assembly for dynamically stabilized support of airborne equipment at a substantial distance from the towing aircraft, comprising a hollow elongated generally cylindrical aeroform body enclosed at its forward and rearward ends by suitable faired surfaces and arranged to support a substantial mass therein with its weight so distributed that the center of gravity of the loaded body is substantially midway between its ends, an elongated horizontally disposed airfoil-shaped lifting surface attached intermediate its ends to the upper surface of said body adjacent its rearward end and symmetrically arranged to extend transversely of said body, a pair of vertical airfoil-shaped stabilizing surfaces mounted upon the opposite ends of said horizontal surface and arranged to depend therefrom, a faired supporting structure projecting upwardly from said body adjacent its forward end, and attachment means mounted upon said supporting structure for connecting said body to the end of a towing cable, said attachment means and the center of pressure of said lifting surface being so disposed longitudinally of said body that the center of gravity thereof is located substantially midway between the attachment means and the center of pressure, whereby the forward and upward force supplied by a towing cable acting through the attachment means and the rearward and upward resultant force applied through the center of pressure of the horizontal lifting surface and thence to the body together oppose the downward force effectively applied to the body at its center of gravity, thereby maintaining said capsule assembly in a substantially horizontal flight position with a high degree of stability.

5. A nose towed airborne capsule assembly for dynamically stabilized support of airborne equipment at a substantial distance from the towing aircraft, comprising a hollow elongated generally cylindrical aeroform body enclosed at its forward and rearward ends by suitable faired surfaces and arranged to support a substantial mass therein with its weight so distributed that the center of gravity of the loaded body is substantially midway between its ends, an elongated horizontally disposed airfoil-shaped lifting surface attached intermediate its ends to the upper surface of said body adjacent its rearward end and symmetrically arranged to extend transversely of said body, a pair of vertical airfoil-shaped stabilizing surfaces mounted upon the opposite ends of said horizontal surface and arranged to depend therefrom, a faired supporting structure projecting upwardly from said body adjacent its forward end, laterally spaced attachment means mounted upon opposite sides of said supporting structure, and a towing bridle connected at its opposite ends to the respective attachment means and having coupling means disposed midway between its opposite ends for attachment to the end of a towing cable, said attachment means and the center of pressure of said lifting surface being so disposed longitudinally of said body that the center of gravity thereof is located substantially midway between the attachment means and the center of pressure, whereby the forward and upward force supplied by a towing cable acting through the attachment means and the rearward and upward resultant force applied through the center of pressure of the horizontal lifting surface and thence to the body together oppose the downward force effectively applied to the body at its center of gravity, thereby maintaining said capsule assembly in a substantially horizontal flight position with a high degree of stability.

6. A nose towed airborne capsule assembly for dynamically stabilized support of airborne equipment at a substantial distance from the towing aircraft, comprising a hollow elongated generally cylindrical aeroform body enclosed at its forward and rearward ends by suitable faired surfaces and arranged to support a substantial mass therein with its weight so distributed that the center of gravity of the loaded body is substantially midway between its ends, said body being at least four times as long as its greatest transverse dimension, an elongated horizontally disposed airfoil-shaped lifting surface attached intermediate its ends to the upper surface of said body adjacent its rearward end, within the rearmost quarter of its length, and symmetrically arranged to extend transversely of said body, a pair of vertical airfoil-shaped stabilizing surfaces mounted upon the opposite ends of said horizontal surface and arranged to depend therefrom, a faired supporting structure projecting upwardly from the forward end of said body, within the forwardmost quarter of its length, laterally spaced attachment means mounted upon opposite sides of said supporting structure, and a towing bridle connected at its opposite ends to the respective attachment means and having coupling means disposed midway between its opposite ends for attachment to the end of a towing cable, said attachment means and the center of pressure of said horizontal lifting surface being so disposed longitudinally of said body that the center of gravity thereof is located substantially midway between the attachment means and the center of pressure and the mass of said loaded body being so disposed that the center of gravity is located substantially below said horizontal lifting surface and said attachment means when the body is horizontally disposed, whereby the forward and upward force supplied by a towing cable acting through the attachment means and the rearward and upward resultant force applied through the center of pressure of the horizontal lifting surface and thence to the body together oppose the downward force effectively applied to the body at its center of gravity, thereby maintaining said capsule assembly in a substantially horizontal flight position with a high degree of stability.

References Cited in the file of this patent
UNITED STATES PATENTS

| | | |
|---|---|---|
| 2,124,867 | Akerman | July 26, 1938 |
| 2,399,217 | Fahrney | Apr. 30, 1946 |
| 2,649,262 | Fahrney | Aug. 18, 1953 |